(12) United States Patent
Qin et al.

(10) Patent No.: US 8,718,721 B2
(45) Date of Patent: May 6, 2014

(54) MOBILE WIRELESS COMMUNICATIONS DEVICE INCLUDING A MAGNETICALLY CONDUCTIVE BODY AND RELATED METHODS

(75) Inventors: Xiaoping Qin, Kanata (CA); Kenneth John Maclean, Kanata (CA)

(73) Assignee: BlackBerry Limited, Waterloo, Ontario (CA)

( * ) Notice: Subject to any disclaimer, the term of this patent is extended or adjusted under 35 U.S.C. 154(b) by 374 days.

(21) Appl. No.: 13/005,347

(22) Filed: Jan. 12, 2011

(65) Prior Publication Data

US 2011/0306392 A1    Dec. 15, 2011

Related U.S. Application Data

(60) Provisional application No. 61/353,322, filed on Jun. 10, 2010.

(51) Int. Cl.
*H04M 1/10* (2006.01)

(52) U.S. Cl.
USPC .............. 455/575.1; 455/575.3; 455/575.4; 29/428

(58) Field of Classification Search
USPC ............... 455/575.1, 575.3, 575.4; 29/428
See application file for complete search history.

(56) References Cited

U.S. PATENT DOCUMENTS

| | | | |
|---|---|---|---|
| 6,060,969 A | 5/2000 | Hufgard et al. | 335/207 |
| 6,314,183 B1 | 11/2001 | Pehrsson et al. | 379/433.06 |
| 6,333,647 B1 | 12/2001 | Plagens | 327/55 |
| 6,456,841 B1 | 9/2002 | Tomimori | 455/412 |
| 7,074,045 B2 | 7/2006 | Kawahigashi et al. | 439/38 |
| 7,636,591 B2 | 12/2009 | Kim et al. | 455/575.4 |
| 7,672,700 B2 | 3/2010 | Oda | 455/575.4 |
| 8,104,165 B1* | 1/2012 | Steigerwald et al. | 29/601 |
| 2001/0041543 A1 | 11/2001 | Lim | 455/90 |
| 2002/0119802 A1 | 8/2002 | Hiji | 455/550 |
| 2004/0227730 A1 | 11/2004 | Sugihara | 345/157 |
| 2005/0208799 A1* | 9/2005 | Oda | 439/135 |
| 2007/0089311 A1 | 4/2007 | Amundson et al. | 33/355 |
| 2008/0150522 A1 | 6/2008 | Hikichi | 324/251 |
| 2010/0145263 A1* | 6/2010 | Barak | 604/67 |

FOREIGN PATENT DOCUMENTS

| | | | | |
|---|---|---|---|---|
| DE | 19905302 | 8/1999 | ............ | H04M 1/02 |
| EP | 1501259 | 1/2005 | ............ | H04M 1/02 |

\* cited by examiner

*Primary Examiner* — Justin Lee

(74) *Attorney, Agent, or Firm* — Allen, Dyer, Doppelt, Milbrath & Gilchrist, P.A.

(57) ABSTRACT

A mobile wireless communications device may include first and second housings coupled together and moveable between first and second positions. The mobile wireless communications device may also include wireless transceiver circuitry carried by at least one of the first and second housings, a magnetic sensor carried by the first housing and coupled to the wireless transceiver circuitry, and a magnet carried by the second housing. The mobile wireless communications device may also include a magnetically conductive body operatively coupled between the magnetic sensor and the magnet when the first and second housings are in the first position.

23 Claims, 5 Drawing Sheets

MOBILE WIRELESS COMMUNICATIONS DEVICE INCLUDING A MAGNETICALLY CONDUCTIVE BODY AND RELATED METHODS

RELATED APPLICATION

The present application is based upon previously filed copending provisional application Ser. No. 61/353,322, filed Jun. 10, 2010, the entire subject matter of which is incorporated by reference in its entirety.

TECHNICAL FIELD

The present disclosure relates to the field of wireless communications, and, more particularly, to mobile wireless communications devices and related methods.

BACKGROUND

Mobile wireless communications systems continue to grow in popularity and have become an integral part of both personal and business communications. For example, cellular telephones allow users to place and receive voice calls almost anywhere they travel. Moreover, as cellular telephone technology has increased, so too has the functionality of cellular devices and the different types of devices available to users. For example, many cellular devices now incorporate personal digital assistant (PDA) features such as calendars, address books, task lists, etc. Moreover, such multi-function devices may also allow users to wirelessly send and receive electronic mail (email) messages and access the Internet via a cellular network and/or a wireless local area network (WLAN), for example.

Even so, as the functionality of cellular communications devices continues to increase, so too does the demand for smaller devices which are easier and more convenient for users to carry. One challenge this poses for cellular device manufacturers is designing the layout of components for additional functionality and operational stability within the relatively limited amount of space available for the components.

DETAILED DESCRIPTION OF THE PREFERRED EMBODIMENTS

The present description is made with reference to the accompanying drawings, in which various example embodiments are shown. However, many different example embodiments may be used, and thus the description should not be construed as limited to the example embodiments set forth herein. Rather, these example embodiments are provided so that this disclosure will be thorough and complete. Like numbers refer to like elements throughout, and prime notation is used to indicate similar elements in alternative embodiments.

In accordance with an exemplary aspect, a mobile wireless communications device may include first and second housings coupled together and moveable between first and second positions. The mobile wireless communications device may also include wireless transceiver circuitry carried by at least one of the first and second housings, a magnetic sensor carried by the first housing and coupled to the wireless transceiver circuitry, and a magnet carried by the second housing. The mobile wireless communications device may also include a magnetically conductive body operatively coupled between the magnetic sensor and the magnet when the first and second housings are in the first position.

The magnetically conductive body may be carried by the first housing. Alternatively, the magnetically conductive body may be carried by the second housing, for example. The magnetically conductive body may include a magnetically conductive body having a permeability greater than $8 \times 10^{-4}$ H/m.

The magnet and the magnetic sensor may be laterally offset when the first and second housings are in the first position. The magnetically conductive body may have a first end overlapping the magnetic sensor and a second end overlapping the magnet when the first and second housings are in the first position, for example.

The first and second housings may include dielectric material. The magnetically conductive body may be positioned on an outside of one of the first and second housings, for example. The magnet may include a permanent magnet.

The first and second housings may be rotatably coupled. Alternatively, the first and second housings may be slideably coupled. The wireless transceiver circuitry may be selectively enabled based upon the magnetic sensor.

A method aspect is directed to a method of making a mobile wireless communications device. The method may include coupling together first and second housings to be moveable between first and second positions with wireless transceiver circuitry within at least one of the first and second housings. The method also includes positioning a magnetic sensor in the first housing and coupled to the wireless transceiver circuitry, for example. The method may further includes positioning a magnet within the second housing, and positioning a magnetically conductive body to be operatively coupled between the magnetic sensor and the magnet when the first and second housings are in the first position, for example.

Figure 1:
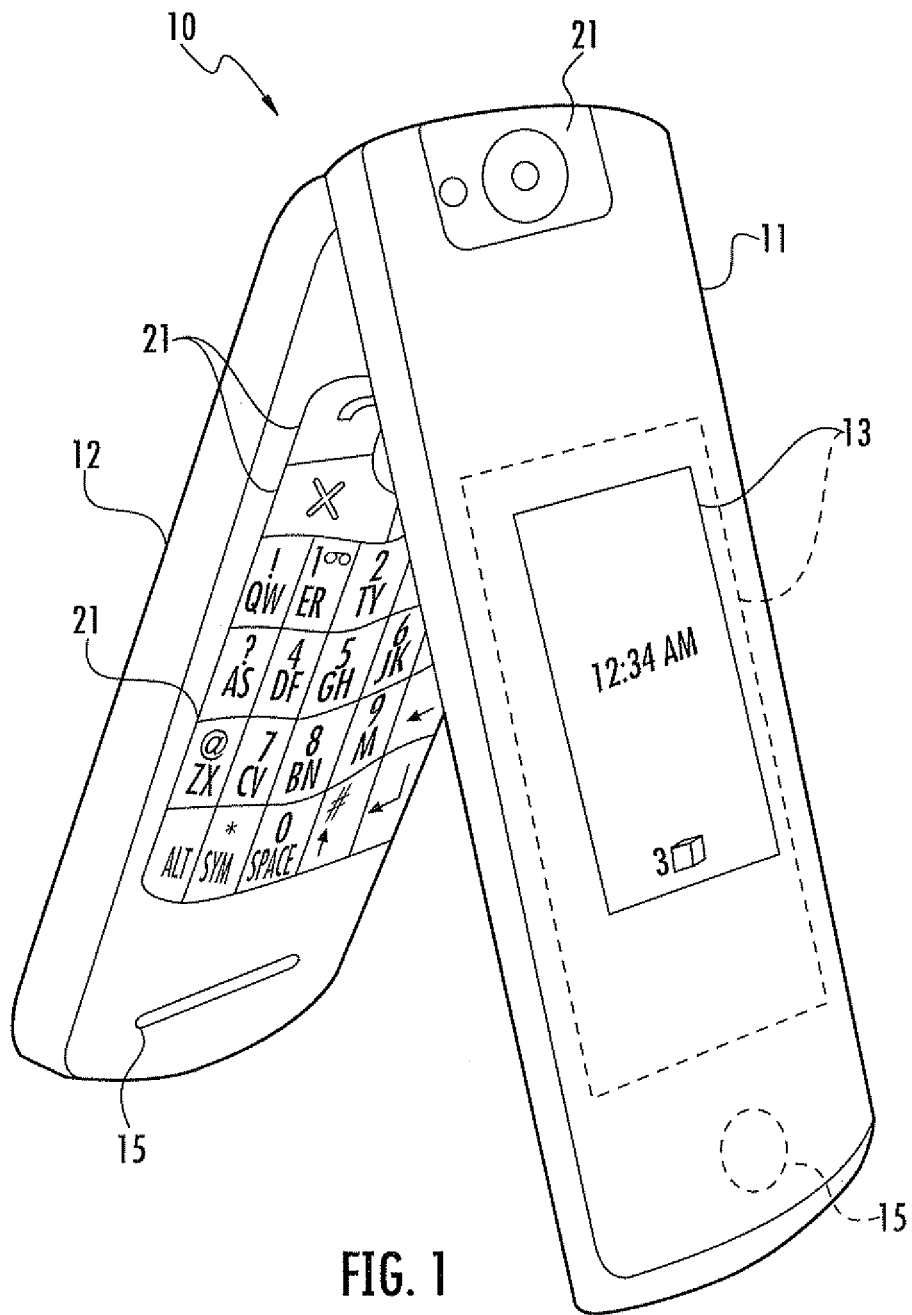
FIG. 1 is a perspective view of a mobile wireless communications device including a magnetically conductive body in accordance with one exemplary aspect.
Figure 2:
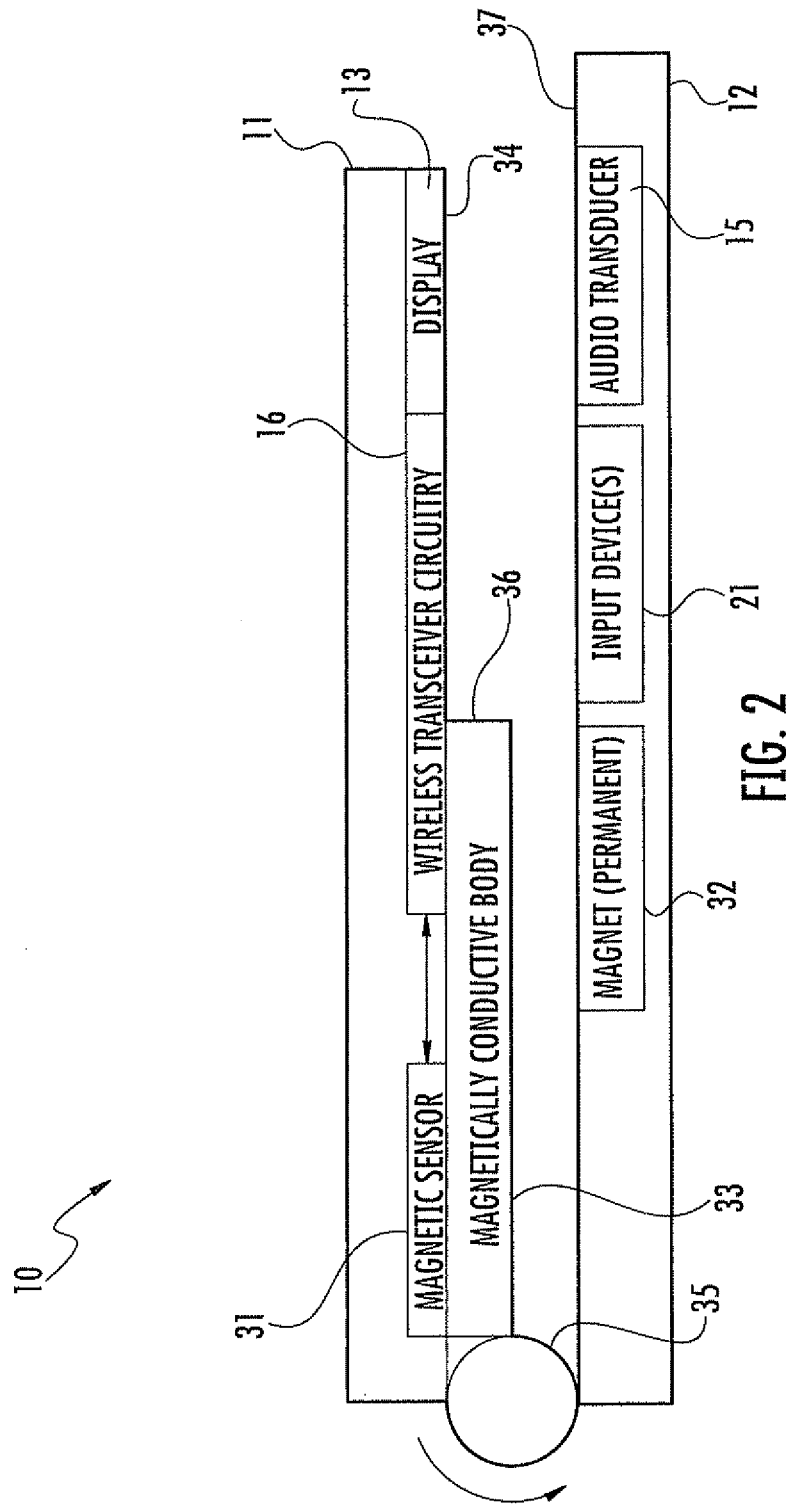
FIG. 2 is a schematic block diagram of the mobile wireless communications device of FIG. 1.

Referring initially to FIGS. 1 and 2, a mobile wireless communications device 10 illustratively includes a first housing 11 and a second housing 12 rotatably coupled and moveable between first and second positions. The first position is illustratively a closed position (FIG. 2), and the second position may be an open position. For example, the mobile wireless communications device 10 may be flipped open, which may correspond to the first and second housings 11, 12 being moved from the first position to the second position. The first and second housings 11, 12 may be dielectric material housings, for example, plastic. The first and second housings 11, 12 may be other materials or a combination of materials as will be appreciated by those skilled in the art.

The mobile wireless communications device 10 also includes wireless transceiver circuitry 16 (FIG. 2), which may include a controller or processor, carried by the first housing 11. The wireless transceiver circuitry 16 may be carried by the second housing 12, or may be carried by both the first and second housings 11, 12. A display 13 is also carried by the first housing 11. Of course, the display may be carried by the second housing 12, and more than one display may be carried by the first housing 11, second housing 12, or a combination of the first and second housings, as will be appreciated by those skilled in the art.

The mobile wireless communications device 10 also illustratively includes an audio transducer 15 carried by the second housing 12. The audio transducer 15 may be a microphone, for example. The audio transducer 15 may also be a speaker. In some example embodiments, there may be more than one audio transducer 15, for example, a microphone and speaker may be used and carried by the first and second housings 11, 12, respectively (FIG. 1).

The mobile wireless communications device 10 includes one or more input devices 21. The input devices 21 illustratively include push buttons for cooperating with the wireless transceiver circuitry 16 (FIG. 1). In some example embodiments, the input device 21 may be an alphanumeric keypad, camera, or other input device for cooperating with the wireless transceiver circuitry 16, for example. Still further, an input device 21 may be coupled to the display 13 to accept a touching input therefrom and cooperate with the wireless transceiver circuitry 16, for example.

The mobile wireless communications device 10 also includes a magnetic sensor 31 carried by the first housing 11. The magnetic sensor 31 is coupled to the wireless transceiver circuitry 16. The magnetic sensor 31 may be a Hall Effect sensor, for example. Other types of magnetic sensors may be used, as will be appreciated by those skilled in the art.

A magnet 32 is carried by the second housing 12. The magnet 32 may be a permanent magnet, for example. The magnetic sensor 31 and magnet 32 may cooperate with the wireless transceiver circuitry 16 to detect relative movement between the first and second housings 11, 12, for example. Accordingly, the device 10, and more particularly, the wireless transceiver circuitry 16, for example, may be selectively enabled based upon the magnetic sensor. For example, the device 10 may switch from a low power state when closed, to a higher power operational state when opened, as would be appreciated by those skilled in the art.

The magnet 32 and the magnetic sensor 31 are illustratively laterally offset when the first and second housings 11, 12 are in the first position, i.e. closed. As will be appreciated by those skilled in the art, the magnet 32 and the magnetic sensor 31 may be laterally offset because of limited space within the first and second housings 11, 12. As a result of the magnet 32 and the magnetic sensor 31 being offset, the performance or detection sensitivity of movement between the first and second housings 11, 12 would otherwise be reduced without the magnetically conductive body 33.

The mobile wireless communications device 10 further includes the magnetically conductive body 33 that is operatively coupled between the magnetic sensor 31 and the magnet 32 when the first and second housings 11, 12 are in the first position. More particularly, the magnetically conductive body 33 is carried by an outside surface 34 of the first housing 11. In some embodiments, the magnetically conductive body 33 may be carried by the second housing 12 and may be on an inside surface of the first housing 11 or second housing.

The magnetically conductive body 33 has a first end 35 overlapping the magnetic sensor 31. The magnetically conductive body 33 also has a second end 36 overlapping the magnet 32 when the first and second housings 11, 12 are in the first position. As will be appreciated by those skilled in the art, the magnetic sensor 31 and the magnet 32 are vertically spaced apart by the first and second housings 11, 12 (FIG. 2) to allow the magnetically conductive body 33 to extend and overlap the magnet and the magnetic sensor.

The magnetically conductive body 33 advantageously extends the magnetic field generated by the magnet 32 to the magnetic sensor 33. Thus, the performance or detection sensitivity of movement between the first and second housings 11, 12 is ensured. Moreover, costs associated with redesign of the layout of components and circuitry carried by the first and second housings 11, 12 may be reduced. Indeed, as will be appreciated by those skilled in the art, a larger size magnetically conductive body 33 may correspond to improved sensitivity.

The magnetically conductive body 33 may be a carbon steel body, for example. The magnetically conductive body 33 may also include silicon, for example silicon steel. The magnetically conductive body 33 may include other magnetic materials, for example, materials having permeability greater than $8 \times 10^{-1}$ H/m. Additionally, the magnetically conductive body 33 may not retain magnetic properties after the magnetic field generated from the magnet 22 is removed. In other words, the magnetically conductive body 33 may be a temporary magnet.

Additionally, the magnet 32 may be carried by second housing 12 irrespective of its polar orientation. For improved performance, the magnetic poles may be aligned perpendicularly with respect to the magnetically conductive body 33, regardless of which of the magnetic poles is closer to the magnetically conductive body. In contrast, performance or detection sensitivity may be decreased if the magnetic poles are generally parallel to the magnetically conductive body 33.

Figure 3:
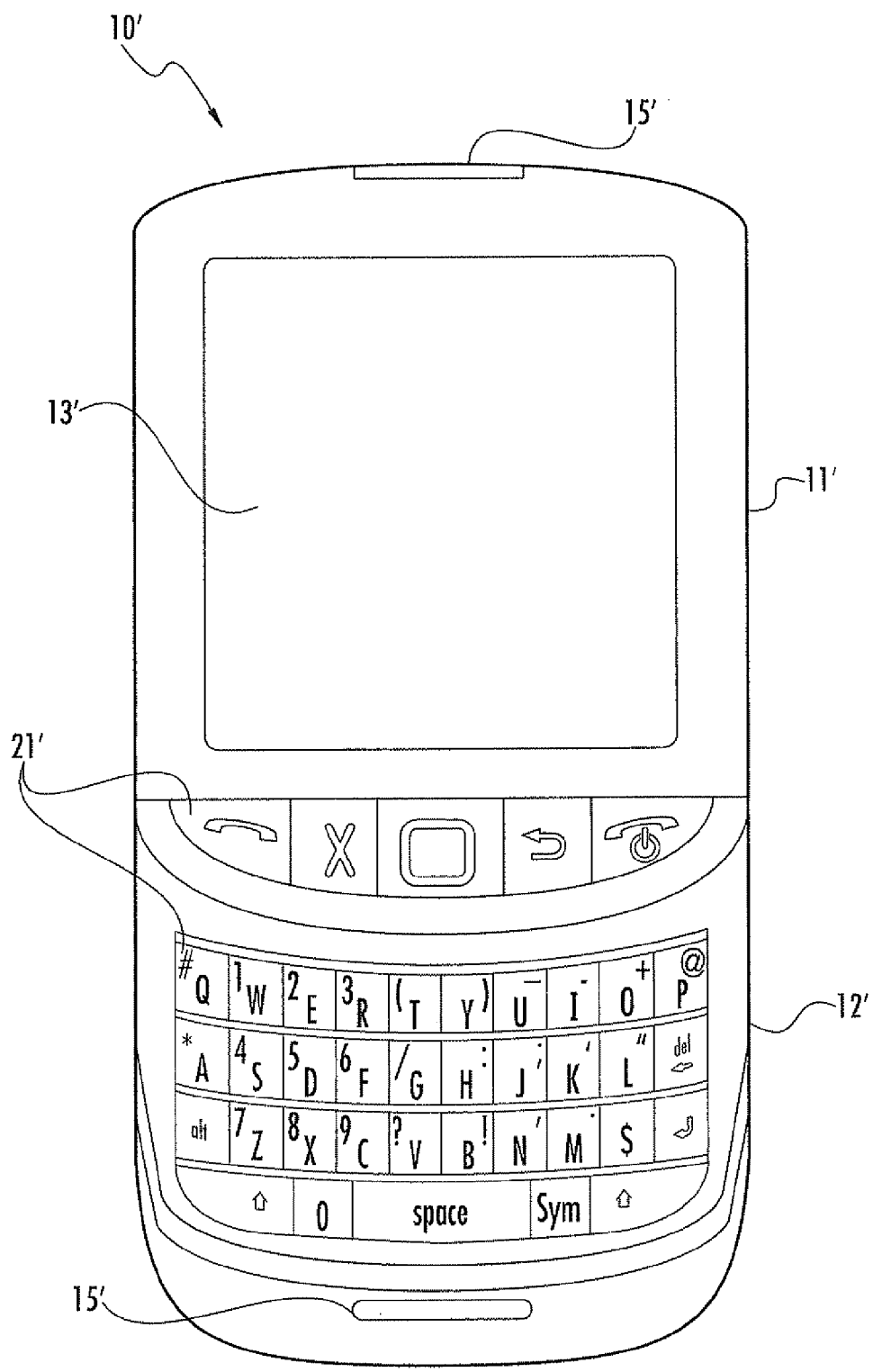
FIG. 3 is a perspective view of a mobile wireless communications device in accordance with another exemplary aspect.
Figure 4:
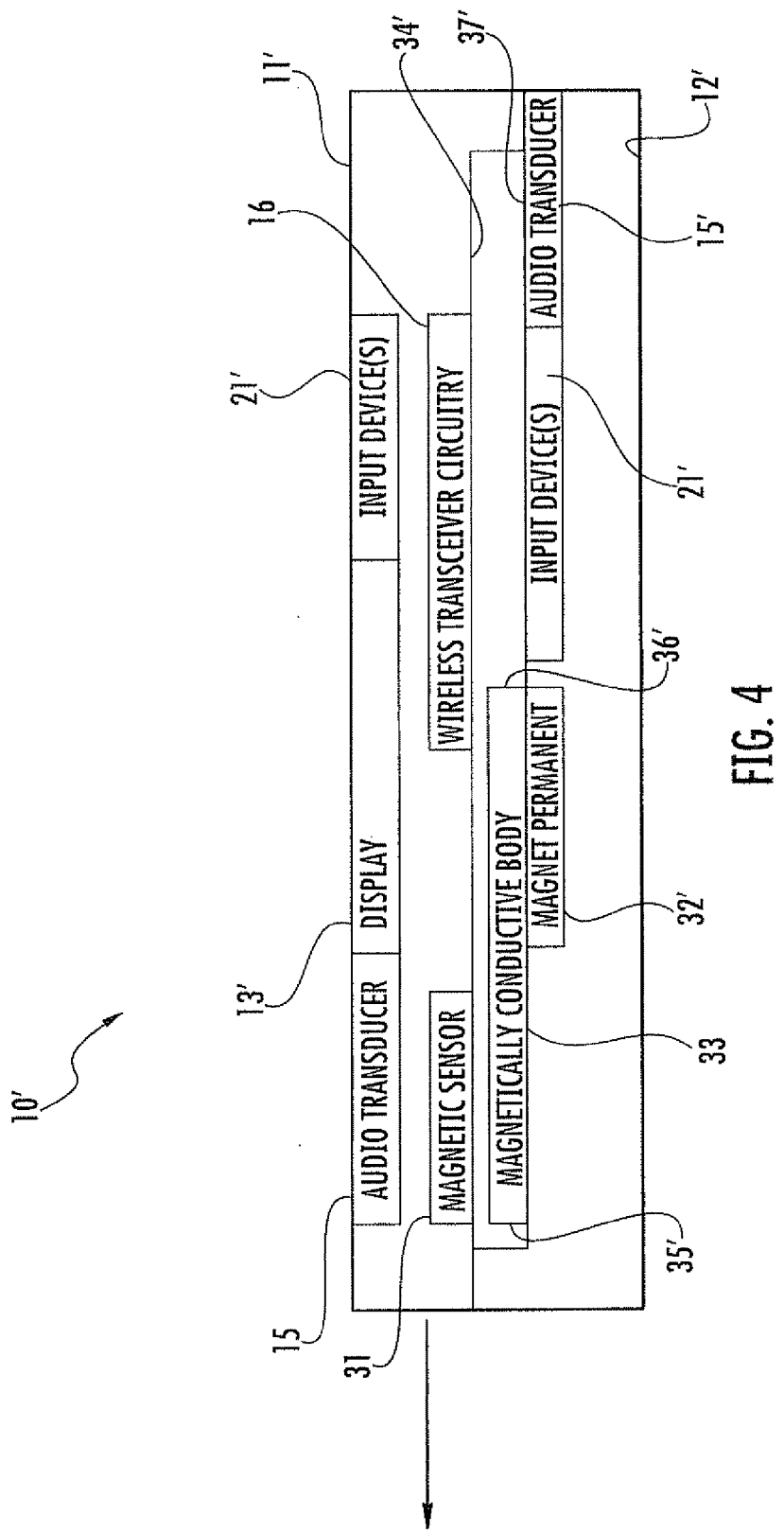
FIG. 4 is a schematic block diagram of another embodiment of the wireless communications device of FIG. 3.

Referring now to FIGS. 3 and 4, another embodiment of the mobile wireless communications device 10' includes first and second housings 11', 12' slideably coupled together and moveable between the first and second positions. The first position may be a closed position (FIG. 4), and the second position may be an open position (FIG. 3), for example. For example, the mobile wireless communications device 10' may be slid open, which may correspond to the first and second housings 11', 12' moving from the first position to the second position. The magnetically conductive body 33' is illustratively carried by an outside portion 37' of the second housing 12'. In some embodiments, the magnetically conductive body 33' may be carried within the second housing 12' or may be carried by or within the first housing 11'.

A method aspect is directed to a method of making a mobile wireless communications device 10. The method includes coupling together first and second housings 11, 12 to be moveable between first and second positions with wireless transceiver circuitry 16 within at least one of the first and second housings 11, 12, and positioning a magnetic sensor 31 in the first housing and coupled to the wireless transceiver circuitry. The method further includes positioning a magnet 32 within the second housing 12, and positioning a magnetically conductive body 33 to be operatively coupled between the magnetic sensor 31 and the magnet when the first and second housings 11, 12 are in the first position.

Exemplary components that may be used in various embodiments of the above-described mobile wireless communications device are now described with reference to an exemplary mobile wireless communications device 1000 shown in FIG. 5. The device 1000 illustratively includes a housing 1200, a keypad 1400 and an output device 1600. The output device shown is a display 1600, which may comprise a full graphic LCD. In some embodiments, display 1600 may comprise a touch-sensitive input and output device. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user. In some embodiments, keypad 1400 may comprise a physical keypad or a virtual keypad (e.g., using a touch-sensitive interface) or both.

The housing 1200 may be elongated vertically, or may take on other sizes and shapes (including clamshell housing structures, for example). The keypad 1400 may include a mode selection key, or other hardware or software for switching between text entry and telephony entry.

Figure 5:
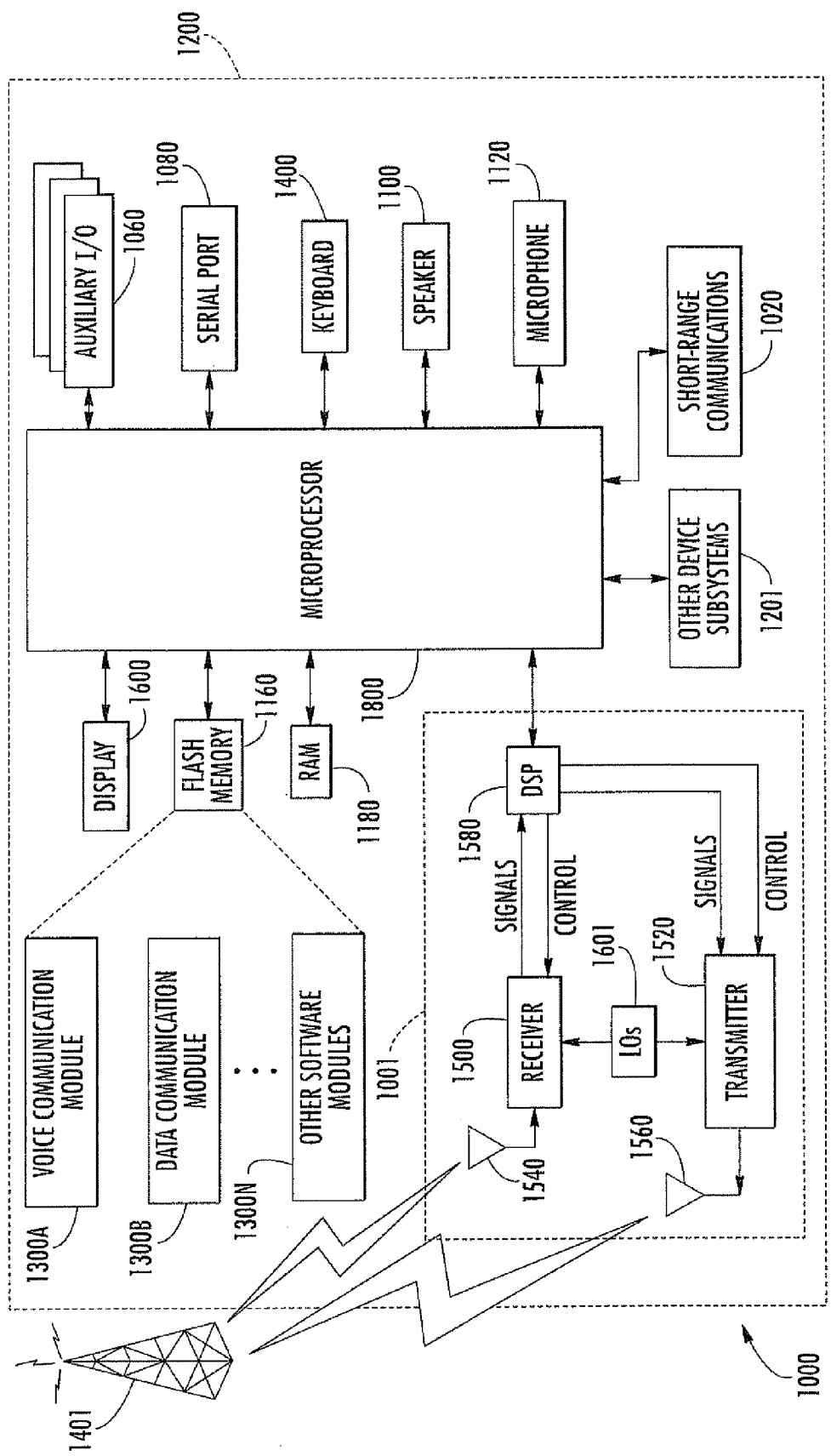
FIG. 5 is a schematic block diagram illustrating additional components that may be included in the mobile wireless communications device of FIG. 1.

In addition to the processing device 1800, other parts of the mobile device 1000 are shown schematically in FIG. 5. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having voice and data communications capabilities. In addition, the mobile device 1000 may have the capability to communicate with other computer systems via the Internet.

Operating system software executed by the processing device 1800 may be stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications or modules 1300A-1300N on the device 1000, such as software modules for performing various steps or operations. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, COMA, WCDMA, PCS, GSM, EDGE, etc. Other types of data and voice networks, both separate and integrated, may also be utilized with the mobile device 1000. The mobile device 1000 may also be compliant with other communications standards such as GSM, 3G, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore utilizes a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included.

That which is claimed is:

1. A mobile wireless communications device comprising:
   first and second housings coupled together and moveable between first and second positions;
   wireless transceiver circuitry carried by at least one of said first and second housings;
   a magnetic sensor carried by said first housing and coupled to said wireless transceiver circuitry;
   a magnet carried by said second housing; and
   a magnetically conductive body operatively coupled between said magnetic sensor and said magnet when said first and second housings are in the first position;
   said first and second housings comprising dielectric material;
   said magnetically conductive body being positioned on an outside of one of the first and second housings.

2. The mobile wireless communications device according to claim 1, wherein magnetically conductive body is carried by said first housing.

3. The mobile wireless communications device according to claim 1, wherein magnetically conductive body is carried by said second housing.

4. The mobile wireless communications device according to claim 1, wherein said magnet and said magnetic sensor are laterally offset when said first and second housings are in the first position.

5. The mobile wireless communications device according to claim 4, wherein said magnetically conductive body has a first end overlapping said magnetic sensor and a second end overlapping said magnet when said first and second housings are in the first position.

6. The mobile wireless communications device according to claim 1, wherein said magnet comprises a permanent magnet.

7. The mobile wireless communications device according to claim 1, wherein said first and second housings are rotatably coupled.

8. The mobile wireless communications device according to claim 1, wherein said first and second housings are slideably coupled.

9. The mobile wireless communications device according to claim 1, wherein said magnetically conductive body comprises a magnetically conductive body having a permeability greater than $8 \times 10^{-4}$ H/m.

10. The mobile wireless communications device according to claim 1, wherein said wireless transceiver circuitry is selectively enabled based upon said magnetic sensor.

11. A mobile wireless communications device comprising:
    first and second housings coupled together and moveable between first and second positions;
    wireless transceiver circuitry carried by at least one of said first and second housings;
    a magnetic sensor carried by said first housing and coupled to said wireless transceiver circuitry;
    a permanent magnet carried by said second housing; and
    a magnetically conductive body operatively coupled between said magnetic sensor and said permanent magnet when said first and second housings are in the first position;
    said permanent magnet and said magnetic sensor being laterally offset when said first and second housings are in the first position;
    said first and second housings comprising dielectric material;
    said magnetically conductive body being positioned on an outside of one of the first and second housings.

12. The mobile wireless communications device according to claim 11, wherein magnetically conductive body is carried by said first housing.

13. The mobile wireless communications device according to claim 11, wherein magnetically conductive body is carried by said second housing.

14. The mobile wireless communications device according to claim 11, wherein said magnetically conductive body has a first end overlapping said magnetic sensor and a second end overlapping said permanent magnet when said first and second housings are in the first position.

15. The mobile wireless communications device according to claim 11, wherein said first and second housings are rotatably coupled.

16. The mobile wireless communications device according to claim 11, wherein said first and second housings are slideably coupled.

17. The mobile wireless communications device according to claim 11, wherein said wireless transceiver circuitry is selectively enabled based upon said magnetic sensor.

18. A method of making a mobile wireless communications device comprising:
    coupling together first and second housings to be moveable between first and second positions with wireless transceiver circuitry within at least one of the first and second housings;
    positioning a magnetic sensor in the first housing and coupled to the wireless transceiver circuitry;
    positioning a magnet within the second housing; and
    positioning a magnetically conductive body to be operatively coupled between the magnetic sensor and the magnet when the first and second housings are in the first position;
    the first and second housings comprising dielectric material;
    positioning the magnetically conductive body comprising positioning the magnetically conductive body on an outside of one of the first and second housings.

19. The method according to claim 18, wherein positioning the magnetically conductive body comprises positioning the magnetically conductive body within the first housing.

20. The method according to claim 18, wherein positioning the magnetically conductive body comprises positioning the magnetically conductive body within the second housing.

21. The method according to claim 18, wherein the magnet and the magnetic sensor are positioned laterally offset when the first and second housings are in the first position.

22. The method according to claim 21, wherein positioning the magnetically conductive body comprises positioning a first end of the magnetically conductive body to overlap the magnetic sensor and positioning a second end of the magnetically conductive material to overlap the magnet when the first and second housings are in the first position.

23. The method according to claim 18, wherein the magnet comprises a permanent magnet.

* * * * *

UNITED STATES PATENT AND TRADEMARK OFFICE
CERTIFICATE OF CORRECTION

PATENT NO. : 8,718,721 B2
APPLICATION NO. : 13/005347
DATED : May 6, 2014
INVENTOR(S) : Qin et al.

It is certified that error appears in the above-identified patent and that said Letters Patent is hereby corrected as shown below:

In the Claims:

Column 7, Line 25  Insert: --the-- between "wherein" and "magnetically"

Column 7, Line 28  Insert: --the-- between "wherein" and "magnetically"

Signed and Sealed this
Nineteenth Day of August, 2014

Michelle K. Lee
*Deputy Director of the United States Patent and Trademark Office*